United States Patent Office 3,317,438
Patented May 2, 1967

3,317,438
HYDROCARBON CONVERSION PROCESS AND
CATALYTIC CONTACT MATERIAL THEREFOR
Gordon R. Engebretson, Park Forest, and John Mooi,
Homewood, Ill., assignors to Sinclair Research, Inc.,
New York, N.Y., a corporation of Delaware
No Drawing. Filed Jan. 21, 1965, Ser. No. 427,126
5 Claims. (Cl. 252—455)

This invention concerns novel contact materials which are of special utility in the conversion of heavy petroleum fractions to lower boiling materials. The novel contact materials are derived from the mineral feldspar and generally retain the essential crystalline structure of this mineral. In one embodiment, this invention provides a superior hydrocarbon cracking catalyst which also may be used as a support for promoters in a catalyst designed, for instance, for paraffin isomerization, hydrocarbon hydrocracking or other hydrogenation treatment. The catalyst is a mixture of amorphous oxides of the elements of atomic number 12–14, usually silica-alumina or silica-magnesia, with the feldspar derivative.

Feldspar is a solid crystalline silicate material containing aluminum and an alkali or alkaline earth metal. Feldspars have the general formula:

$$MAl_xSi_{4-x}O_8$$

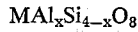

where M is a metal cation of valence $x$ and $x$ is an integer of 1–2. The various naturally occurring feldspars, usually anorthoclase, $NaAlSi_3O_8$, orthoclase $KAlSi_3O_8$ or anorthite $CaAl_2Si_2O_8$ have a triclinic crystalline structure and often are found in admixture with each other. Calcium feldspars are preferred for use in this invention. It has been found that other monovalent, divalent or trivalent cations may be substituted for the Na, K or Ca in the naturally occurring materials, and usually about 30–80% of the naturally occurring cation, preferably about 40–60% of the total naturally occurring cations are removed. Preferably, calcium will comprise no more than about 50% of the remaining cations and sodium or potassium will comprise no more than about 25% of the cations in the finished catalyst. These cations are replaced with hydrogen or other metals of the IIA alkaline earth or the group IIIB type 4f rare earths. Suitable divalent ions are strontium and barium while in the lanthanide rare earths cerium, lanthanum, neodymium and naturally-occurring rare earth mixtures are suitable. Mixtures of different divalent cations with or without one or more trivalent cations may be used to replace the sodium, potassium or calcium. When a portion of the original cation is to be replaced with hydrogen, this may be accomplished by replacing the cation with ammonium, and heating to decompose the ammonium ion. Thus in the finished catalyst the feldspar-derived component will have the formula:

$$L_yM_zAl_xSi_{4-x}O_8$$

where M and $x$ are as defined above, L is a cation, as above described, of valence $w$ and $y$ and $z$ are fractional values such that $w(y)+x(z)=x$, $z$ being no greater than about 0.25.

The cation replacement may be conveniently brought about by contacting, for example, by soaking, the feldspar with an aqueous solution of the cation or cations which are to replace the original cations. Such a solution is usually made by dissolving a salt of the desired metal in distilled or deionized water. Suitable salts are the chlorides, nitrates, or acetates. Excess and extraneous ions will usually be washed out of the mineral before the contact material is completed. Ordinarily, about 50 to 500 grams of the salt or salts are used per liter of water, preferably about 100 to 300 g./l. Enough solution is generally used to give a slurry of feldspar in solution containing about 1 to 20% solids, preferably about 5%.

The modified feldspar generally will constitute about 1–80% of the finished catalyst of this invention, preferably about 5–50%. The feldspar component will generally be used in a finely divided state achieved by precipitation or grinding. The mineral particles will often be no greater than about 10-micron.

An amorphous silica-alumina portion can be prepared by any conventional technique, such as by addition of sulfuric acid and aluminum sulfate solutions to a sodium silicate solution. The composition of the amorphous silica-alumina phase may be about 5–80% $Al_2O_3$, preferably about 10–50% $Al_2O_3$ with the remainder essentially $SiO_2$.

A silica magnesia gel can be prepared by adding a magnesium sulfate solution to a silica sol. The sol will subsequently set to a hydrogel which can be treated with ammonium hydroxide solution, washed, and dried to give the gel. A silica sol for this preparation is conveniently made by adding sodium silicate solution to a sulfuric acid solution. The composition of the silica-magnesia phase may be about 10–80% MgO, preferably about 15–35% MgO, with the remainder essentially $SiO_2$.

The amorphous phase and mineral phase are mixed at any time when intimate dispersion of the mineral phase in the amorphous phase can be achieved. Preferably, the phases will be mixed before the amorphous phase has been dried. The mineral may also be added during the precipitation of the amorphous phase. The cations of the feldspar may be replaced during any one of a number of stages in the manufacture of the finished contact material. Ordinarily these stages include grinding or otherwise providing the feldspar particles in a finely divided state, mixing with the amorphous silica-containing gel material and forming, drying, etc., this associated material to its finished size. The finished contact material can be macrosize, for instance of bead or tablet form or finely divided form, for use as a fixed, moving or fluidized bed.

Often this invention will provide a finely divided (fluid) catalyst, for instance, having particles predominantly in the 20 to 100 or 150 micron range to be disposed as a fluidized bed in the reaction zone to which a feed is charged continuously and reacted essentially in the vapor phase. If the contact material is to be used in fixed bed operation it should be formed into particles in which the smallest linear dimension is about 1/32 inch. This may be accomplished by any standard forming technique, for example, extrusion or tabletting. It is sometimes advantageous to mix the active contact material with some inert material to facilitate forming, for example, silica or alumina. If inert materials are used they will preferably constitute not more than 50% of the composition.

Catalytically promoted cracking of heavier hydrocarbon feedstocks to produce hydrocarbons of preferred octane rating boiling in the gasoline range is widely practiced and presently uses a variety of commercially available solid oxide catalysts to give end products of fairly uniform composition. Cracking is ordinarily effected to product gasoline as the most valuable product and is generally conducted at temperatures of about 700 to 1100° F., preferably about 850 to 975° F. at pressures up to about 200 p.s.i.g., preferably about atmospheric to 5, 15 or even 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range. The contact material of this invention is especially useful in cracking hydrocarbon feedstocks having an initial boiling point of about 500° F. or more.

Such materials include reduced crudes and other residual stocks, asphalt, the product from butane and/or pentane deoiling of asphalt, etc. A batch, semi-continuous or continuous system may be used, but most often a continuous fluidized system is used. In such system, vaporous cracker effluent is taken overhead and a portion of the catalyst is continuously withdrawn and passed to a regeneration zone where coke or carbon is burned from the catalyst in a fluidized bed by contact with a free oxygen-containing gas before its return to the reaction zone. In a typical operation the catalytic cracking of the hydrocarbon feed would normally result in the conversion of about 40 to 70%, preferably about 50 to 60%, of the feedstock into a product boiling in the gasoline range. The effluent from the cracker conveniently is distilled to isolate the gasoline fraction. Also, products, such as fixed gases, boiling below the gasoline range are removed from the system.

In cracking, coke yield may be held to a minimum through the use of good steam stripping and a high steam partial pressure, and removal of coke from the catalyst is performed by regeneration. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%. Regeneration puts the catalyst in a substantially carbon-free state, that is, the state where little, if any, carbon is burned or oxygen consumed even when the catalyst is contacted with oxygen at temperatures conducive to combustion.

Hydrocracking is usually performed at a temperature higher than about 750° F. say a temperature in the range of about 750–900° F., preferably about 800–850° F. and a pressure in the range of about 100–10,000 p.s.i.g., preferably about 1000–2000 p.s.i.g. A space velocity of about 0.1 to 10 weight of oil feed per weight of catalyst may be employed. Preferably the WHSV is about 0.25–2.0. Hydrogen is provided from any convenient source and consumption can be in the range of about 2000 to 3000 cubic feet per barrel of charge. The effluent from the hydrogenolysis unit is generally separated by fractionation. In hydrocracking a batch, semi-continuous or continuous system may be used, but most often a continuous system is used.

The invention will be better understood by reference to the following examples, which should be considered illustrative only and not limiting.

A solution of cerium nitrate is prepared by dissolving 150 g. $Ce(NO_3)_3 \cdot 6H_2O$ in enough water to make 500 ml. 125 g. of 8–20 mesh particles of anorthite, $CaAl_2Si_2O_8$ is added and the slurry is slowly agitated for 24 hours. The solution is then decanted and the solids washed repeatedly with water to remove uncombined calcium and cerium. The mineral is then dried and ground to a powder in a ball mill. Analysis shows at least 16% cerium and no more than 7% calcium on an ignited weight basis.

A silica-alumina hydrogel is prepared by the following technique: 865 ml. of sodium silicate solution (28.8 weight percent $SiO_2$, 40–41.5 Baumé at 68° F. and $Na_2O:SiO_2$ ratio of 1:3.2) is added to 4,275 ml. of water preheated to 90° F. and the batch is stirred for 5 minutes. With the batch at 90° F., 302 ml. of 34.5 weight percent sulfuric acid solution at 182° F. is added over a period of 45 minutes. A gel forms about 35 minutes after acid addition is begun. Then the pH is adjusted to 8.0–8.5 and the batch is agitated for 10 min. 715 ml. of alum (7.8 weight percent as $Al_2O_3$) is added to the gel over a period of 36 minutes and the batch is agitated for an additional 5 minutes. 205 ml. of sodium aluminate solution (24.4 weight percent as $Al_2O_3$) diluted in 1080 ml. of water is added over a 17 minute period. After all the sodium aluminate is added the pH is about 5.0 to 5.2 and the alumina content of the silica-alumina hydrogel 30–31%.

A portion of the silica-alumina hydrogel is added to the modified anorthite to provide a composition containing about 15% feldspar on a dry basis. The mixture is placed in a Waring Blendor for 5 minutes. The mixture is then placed in a drying oven for 10 hours and when dry the resulting granules are washed with warm water until a negative sulfate test is obtained. The granules are dried and ground with a hammer mill to a powder that will pass a 200 mesh screen. The powder is calcined for 3 hours at 1000° F. in air.

Another portion of the silica-alumina hydrogel is placed in a drying oven for 10 hours and the resulting dry granules are washed with warm water until a negative sulfate test is obtained. The granules are dried and ground with a hammer mill to powder that will pass a 200-mesh screen and then calcined for 3 hours at 1000° F. in air. A 200-gram sample of the catalyst containing the modified feldspar is submitted to a bench scale catalytic cracking test and is found to give a greater yield of material boiling in the gasoline range, and found to show greater selectivity as evidenced by less coke on the catalyst and less hydrogen in the gaseous products than a 200-gram sample of the other catalyst which does not contain feldspar.

It is claimed:

1. A solid contact material consisting essentially of modified feldspar of the general formula $L_yM_zAl_xSi_{4-x}O_8$ where L is a cation of valence $w$ selected from the group consisting of hydrogen, barium, strontium and group IIIB type $4f$ rare earth cations, M is a cation of valence $x$ selected from the group consisting of sodium, potassium and calcium, $x$ is an integer of 1–2, $y$ and $z$ are fractional values such that $w(y)+x(z)=x$ and $z$ is no greater than about 0.25, with which is associated about 20–99% by weight of the contact material of solid synthetic gel selected from the group consisting of 5–80% alumina, the balance essentially silica and 10–80% magnesia, the balance essentially silica.

2. The contact material of claim 1 in which the synthetic gel is 10–50% alumina, the balance essentially silica.

3. The contact material of claim 1 wherein the contact material contains about 50–95% of the said synthetic gel.

4. The contact material of claim 3 in which the modified feldspar is anorthite in which about 30–80% of the calcium ions have been displaced by cerium ions.

5. The contact material of claim 4 wherein the synthetic gel is 10–50% alumina, the balance essentially silica.

References Cited by the Examiner

UNITED STATES PATENTS

| | | | |
|---|---|---|---|
| 2,203,850 | 6/1940 | Tropsch | 252—450 |
| 2,301,734 | 11/1942 | Melanen et al. | 208—120 |
| 2,369,001 | 2/1945 | Ahlberg et al. | 208—120 |

DELBERT E. GANTZ, *Primary Examiner.*

A. RIMENS, *Assistant Examiner.*